United States Patent [19]

Ohira et al.

[11] 4,042,069
[45] Aug. 16, 1977

[54] AC ELEVATOR CONTROL SYSTEM

[75] Inventors: Takeshi Ohira; Akinori Watanabe, both of Katsuta, Japan

[73] Assignee: Hitachi, Ltd., Japan

[21] Appl. No.: 555,184

[22] Filed: Mar. 4, 1975

[30] Foreign Application Priority Data

Mar. 8, 1974 Japan .................................. 49-26366

[51] Int. Cl.² .............................................. B66B 1/32
[52] U.S. Cl. ................................................ 187/29 R
[58] Field of Search ...................... 187/29; 318/86, 87, 318/370, 371

[56] References Cited

U.S. PATENT DOCUMENTS

| | | | |
|---|---|---|---|
| 2,103,805 | 12/1937 | Williams | 318/371 X |
| 2,828,832 | 4/1958 | Spiess et al. | 187/29 |
| 3,319,142 | 5/1967 | Grepe | 318/371 X |
| 3,687,235 | 8/1972 | Mitsui et al. | 187/29 |
| 3,860,093 | 1/1975 | Mitsui et al. | 187/29 |

*Primary Examiner* — Gene Z. Rubinson
*Assistant Examiner* — W. E. Duncanson, Jr.
*Attorney, Agent, or Firm* — Craig & Antonelli

[57] ABSTRACT

In an AC elevator which is provided with a multi-speed induction motor unit connected to an AC power source and including a high-speed motor and a low-speed motor and in which an elevator car is started and accelerated by the high-speed motor, a control system comprising regenerative braking means connecting the low-speed motor to the AC power source through one set of thyristors connected in parallel in opposite polarity, DC braking means for supplying direct current to the high-speed motor from a controlled reactifier circuit, means for controlling the regenerative braking means to reduce the speed of the elevator car, means for detecting the reduction of the speed of the elevator car to a level at which the regenerative braking means is no more effective in producing the regenerative braking torque, and means for deenergizing the regenerative braking means and energizing the DC braking means in response to the output of the detecting means.

17 Claims, 17 Drawing Figures

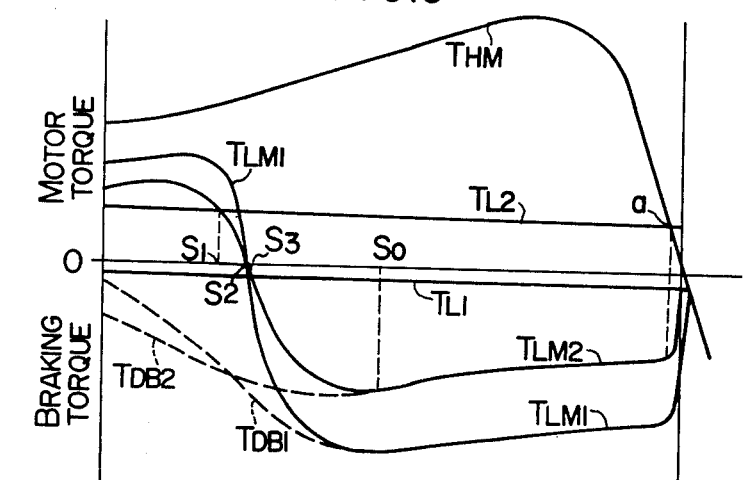
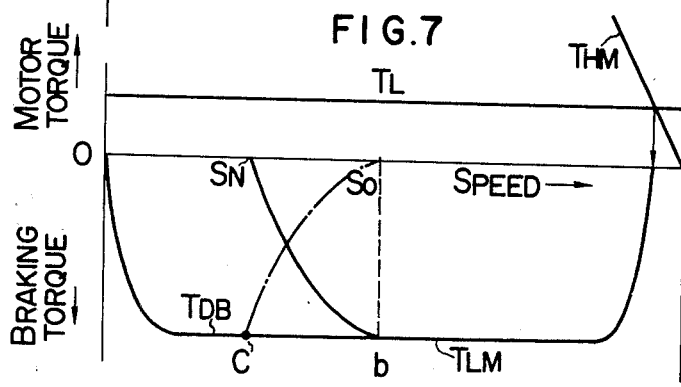

AC ELEVATOR CONTROL SYSTEM

This invention relates to improvements in a control system for an ac elevator in which an elevator car is driven by an ac motor.

In a known ac elevator control system, a dc braking means is employed together with a feedback control means. According to this known control system, a high-speed motor connected to an ac power source drives an elevator car at a high speed until the elevator car is moved to a predetermined deceleration starting position spaced from a target floor, and the high-speed motor is disconnected from the power source when the elevator car reaches such position. As soon as the high-speed motor is disconnected from the power source, direct current is supplied to a low-speed motor from a controlled rectifier circuit including a plurality of thyristors therein. The low-speed motor generates a braking force which acts to reduce the speed of the elevator car. In order that the elevator car can be precisely stopped at the target floor without imparting a shock to the passengers, a feedback control means is generally employed in such a system to control the thyristors in the controlled rectifier circuit for generating a suitable braking force which acts to reduce the running speed of the elevator car at a moderate rate. This known control system is presently widely employed as it can provide a satisfactory operating characteristic required for the elevator of this kind. However, this known control system is defective in that the kinetic energy of the elevator is consumed as heat during the braking period resulting in a corresponding loss of electric power and a corresponding rise in the internal temperature of the machinery room of the elevator.

Another ac elevator control system is also known in which a low-speed motor is connected to an ac power source in the speed reduction range for an elevator car while disconnecting a high-speed motor from the power source and a regenerative braking torque produced in the low-speed motor is utilized to reduce the running speed of the elevator car. In this case, the low-speed motor connected to the ac power source develops a regenerative braking torque in a speed range higher than the synchronous speed thereof. When the rotating speed of the low-speed motor driving the elevator car is reduced to the level of the synchronous speed, the low-speed motor operates now in a motoring state and the elevator car continues to run at a low speed until it reaches a predetermined position spaced from a target floor. The low-speed motor is disconnected from the ac power source as soon as the elevator car reaches the predetermined position, and means such as an electromagnetic brake is energized to stop the elevator car at the target floor.

This known control system is effective in saving electric power due to the fact that the kinetic energy of the elevator car being decelerated can be regeneratively returned to the power source. However, it is unable to control the torque after the rotating speed of the low-speed motor is reduced to the synchronous speed. Therefore, a low speed running range must be provided for the elevator car so that the elevator car can be stopped as by the electromagnetic brake after the elevator car running at the low speed reaches the predetermined position. This low speed running period is apparently a dead time in which no control is applied to the elevator car. This known control system is thus defective in that the period of time required for operation is extended and the passenger transporting efficiency of the elevator car is greatly reduced.

It is therefore a primary object of the present invention to provide an improved ac elevator control system which can attain the saving of electric power and shorten the operating period of time of an elevator car for improving the transporting efficiency of the elevator car.

The ac elevator control system according to the present invention is featured by the fact that an elevator car, is initially driven at a high speed by a high-speed motor in a multi-speed induction motor unit and is subsequently driven in a speed reduction range by a low-speed motor so that the running speed of the elevator car can be reduced by a regenerative braking force produced in the low-speed motor, and another braking torque, for example, a dc braking torque is imparted to the elevator car drive means before a balance point between the braking torque of the low-speed motor and the load torque is reached.

The ac elevator control system having the features above described is advantageous in that the kinetic energy of the elevator can be regeneratively returned to the power source for attaining the desired saving of electric power. Further, another brake which produces a controllable braking torque, such as a dc braking means or an electromagnetic brake, is additionally provided to impart the brake to the elevator car in a considerably low speed range in which the low-speed motor is no more effective in producing the regenerative braking torque, so that the elevator car can arrive at the target floor without running at the low speed over an extended period of time and the operating efficiency of the elevator can be greatly improved.

Other objects, features and advantages of the present invention will be apparent from the following detailed description of preferred embodiments thereof taken in conjunction with the accompanying drawing, in which:

FIGS. 6 to 8 are graphs showing the slip-torque and speed-torque characteristics of the induction motors in FIG. 1;

Figure 1:
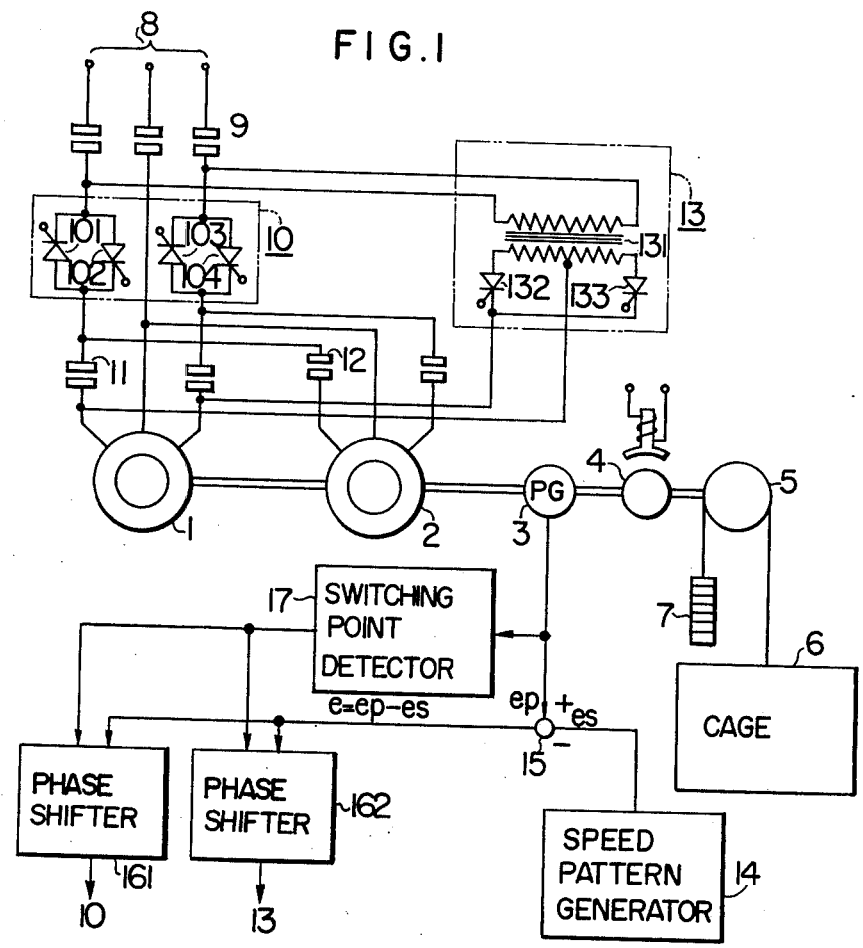
FIG. 1 is a block diagram of an embodiment of the ac elevator control system according to the present invention.

An embodiment of the ac elevator control system according to the present invention will be described with reference to FIGS. 1 to 5. Referring to FIG. 1 showing the general structure of the ac elevator control system embodying the present invention, a high-speed induction motor 1 and a low-speed induction motor 2 constitute a multi-speed induction motor unit. These induction motors 1 and 2 are generally selected to have six poles and 24 poles respectively, and therefore, there is a ratio of 4 : 1 between the synchronous speed of the former and that of the latter. In FIG. 1, the induction motors 1 and 2 are illustrated as being independent of each other. However, these induction motors 1 and 2 may be constructed in the form of a single motor having two windings, and the ratio between the numbers of poles is in no way limited to the value specified above.

These induction motors 1 and 2 are mechanically directly coupled to each other to be connected to a sheave 5 through a tachometer generator 3 and a brake such as an electromagnetic brake 4. An elevator cage 6 and a counterweight 7 are relatively movably supported by a rope trained around the sheave 5 so that the elevator cage 6 can make upward and downward movement. The high-speed induction motor 1 is electrically connected to a three-phase ac power source 8 through main contactors 9, a thyristor circuit 10 and high-speed side contactors 11. The thyristor circuit 10 includes two pairs of thyristors 101, 102 and 103, 104, and the thyristors in each pair are connected in parallel in opposite polarity as shown. The moving speed of the elevator car, which is accelerated after being started, is controlled by controlling the firing angle of the thyristors in the thyristor circuit 10 depending on the deviation of the actual speed from the instructed speed. Normal-reverse switching contactors are provided in the elevator control system for changing the direction of rotation of the induction motors 1 and 2 to cause upward or downward movement of the elevator car, but such contactors are not shown in FIG. 1 to avoid complexity.

The low-speed induction motor 2 is also electrically connected to the three-phase ac power source 8 through the main contactors 9, thyristor circuit 10 and low-speed side contactors 12. In FIG. 1, the electric power is supplied to the low-speed induction motor 2 from the output terminals of the thyristor circuit 10, but it may supplied directly from the three-phase ac power source 8 while bypassing the thyristor circuit 10. This low-speed induction motor 2 is provided principally for the purpose of maintenance of the elevator in which the elevator car is driven at a low speed which is generally selected to be about 30 to 40 meters per minute. However, this low-speed induction motor 2 can be effectively utilized to reduce the running speed of the elevator car when the moving elevator car reaches a decelerating point. In the ac elevator control system shown in FIG. 1, the main contactors 9 and high-speed side contactors 11 are turned on, and the firing angle of the thyristors in the thyristor circuit 10 is controlled to control the high-speed induction motor 1 for starting and increasing the speed of the elevator car up to a desired speed. When the elevator car moving at the desired speed reaches a decelerating point, the high-speed side contactors 11 are turned off to disconnect the high-speed induction motor 1 from the ac power source 8, and the low-speed side contactors 12 are turned on to connect the low-speed induction motor 2 to the ac power source 8. The moving speed of the elevator car at this moment is generally far higher than the synchronous speed of the low-speed induction motor 2. Thus, the low-speed induction motor 2 produces a regenerative braking torque which acts to reduce the running speed of the elevator car. Further, by suitably controlling the firing angle of the thyristors in the thyristor circuit 10 as required, this braking torque can be suitably regulated so that the speed of the elevator car moving at the reduced speed can be controlled.

In the present invention, another braking means is provided in addition to the regenerative braking means above described. For example, a dc braking means is combined with the high-speed induction motor 1 in the embodiment shown in FIG. 1. As seen in FIG. 1, a controlled rectifier circuit 13 is connected at the ac input terminals thereof to the output terminals of the main contactors 9 and at the dc output terminals thereof to two of the three terminals of the high-speed induction motor 1. In the form shown in FIG. 1, this controlled rectifier circuit 13 is composed of a transformer 131 and a pair of thyristors 132 and 133. A dc braking torque can be produced in the high-speed induction motor 1 and the value of this torque can be regulated by controlling the firing angle of the thyristors 132 and 133. Needless to say, the effect similar to that above described can be obtained when such dc braking means is combined with the low-speed induction motor 2 in lieu of the high-speed induction motor 1.

A speed pattern signal generator 14 generates a speed pattern signal. The output $e_s$ of the speed pattern signal generator 14 is compared with the output $e_p$ of the tachometer generator 3 by a comparator 15, and the deviation of $e_p$ from $e_s$ is applied to a pair of phase shifters 161 and 162. The phase shifter 161 is provided for the phase control of the thyristors in the thyristor circuit 10, while the phase shifter 162 is provided for the phase control of the thyristors in the controlled rectifier circuit 13. A switching point detector 17 described later is connected between the tachometer generator 3 and the phase shifters 161 and 162. In the form shown in FIG. 1, the switching point detector 17 acts to deenergize and energize the phase shifters 161 and 162 respectively when the tachometer generator output representative of the actual speed of the elevator car is reduced to a certain predetermined level.

Figure 2:
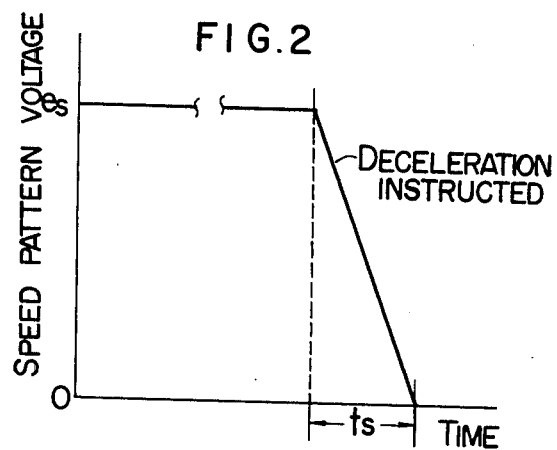
FIG. 2 is a graph showing the relation between time and the output of the speed pattern signal generator in FIG. 1 in the speed reduction range for the elevator car.

FIG. 2 shows the speed pattern signal voltage delivered relative to time from the speed pattern signal generator 14 shown in FIG. 1. In FIG. 2, the speed pattern signal voltage appearing in the elevator car accelerating stage is not shown as it has not any direct concern with the present invention, and the speed pattern signal voltage appearing after attainment of the top speed is merely shown for the purpose of illustration of the present invention. It is apparent that this speed pattern signal generator 14 can be easily obtained by the combination of means such as an integrator, a transistor and a capacitor, and it is unnecessary to illustrate the detailed circuit structure thereof.

Figure 3:
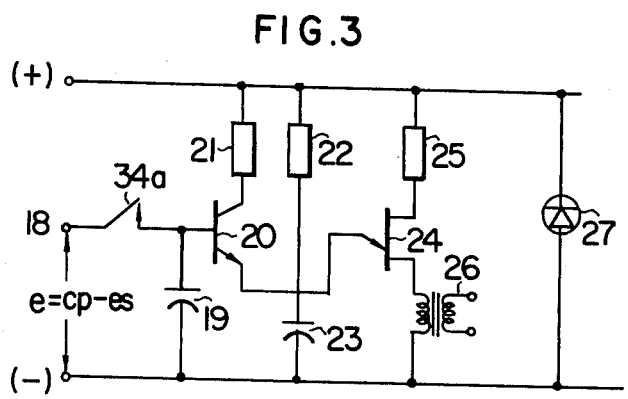
FIG. 3 is a circuit diagram of one form of the phase shifters in FIG. 1.

FIG. 3 shows one form of the practical circuit structure of the phase shifters 161 and 162. Referring to FIG. 3, the output voltage $e(= e_p - e_s)$ of the comparator 15 is applied across an input terminal 18 and the negative terminal of a dc power supply to charge a capacitor 19 through a contact 34a of a relay 34 described later. The voltage charged in this capacitor 19 is applied to the base of a transistor 20. This transistor 20 is connected at the collector thereof to the positive terminal of the dc power supply through a resistor 21 and at the emitter thereof to the connection point of a resistor 22 and a capacitor 23 connected in series.

The voltage charged in the capacitor 23 is applied to a unijunction transistor 24. This unijunction transistor 24 is connected to the dc power supply through a resistor 25 and a pulse transformer 26 so that a pulse signal can be derived from the pulse transformer 26 with the phase which is controlled depending on the level of the input voltage $e$. A voltage regulator diode 27 is connected in parallel with the series connection of the resisrtor 25, unijunction transistor 24 and pulse transformer 26.

Figure 4:
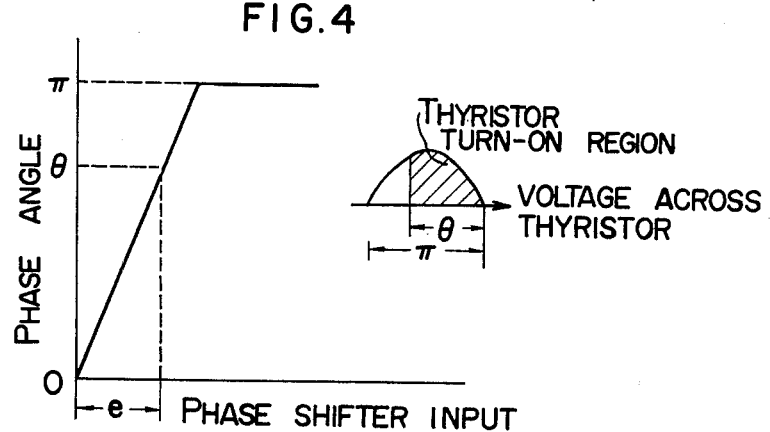
FIG. 4 is a graph showing the relation between the input and the phase angle of the output of the phase shifter structure shown in FIG. 3.

FIG. 4 shows the relation between the input voltage and the phase angle of the output of the phase shifters 161 and 162.

Figure 5:
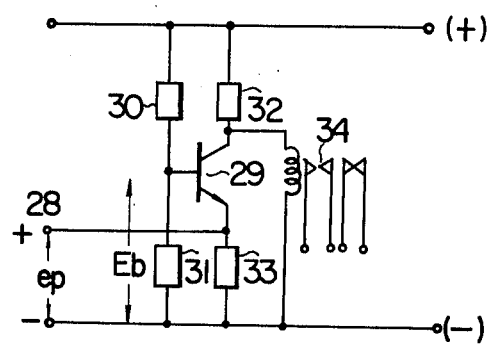
FIG. 5 is a circuit diagram of one form of the switching point detector in FIG. 1 which detects the switching point from the regenerative braking condition to another braking condition.

FIG. 5 is a circuit diagram of one form of the switching point detector 17 shown in FIG. 1. Referring to FIG. 5, the output voltage $e_p$ of the tachometer generator 3 is applied across an input terminal 28 and the negative terminal of a dc power supply. A transistor 29 is controlled by a resistor bridge consisting of resistors 30, 31, 32 and 33. This transistor 29 conducts to deenergize a relay 34 when the input voltage $e_p$ applied across the resistor 33 is lower than a predetermined setting. This relay 34 has a plurality of contacts which are each inserted in the base circuit of the transistor 20 in the phase shifters 161 and 162 shown in FIG. 3. More precisely, a make contact 34a is inserted in the base circuit of the transistor 20 in the phase shifter 161 as shown in FIG. 3, and a break contact 34b (not shown) is inserted in the base circuit of the transistor 20 in the phase shifter 162. These relay contacts 34a and 34b are arranged so that one of them is in make position while the other is in break position.

The operation of the control system of the present invention having such a structure will now be described.

In FIG. 1, the main contactors 9 and high-speed side contactors 11 are turned on in response to the starting instruction signal for the elevator car, and the rotating speed of the high-speed induction motor 1 is controlled by the thyristor circuit 10. The elevator car runs at a high speed until the deceleration instructing point shown in FIG. 2 is reached. Upon detection of this deceleration instructing point by the floor controller (not shown), the high-speed side contactors 11 are turned off and the low-speed side contactors 12 are turned on. In the meantime, the output voltage $e_p$ of the tachometer generator 3 is compared with the output voltage $e_s$ of the speed pattern signal generator 14 by the comparator 15, and the deviation $e = (e_p - e_s)$ is applied to the phase shifters 161 and 162. However, due to the fact that the elevator car is moving at a high speed and the voltage $e_p$ is correspondingly high, the transistor 129 in FIG. 5 is in the non-conducting state and the relay 34 is in the energized state. As a result, the make contact 34a in the phase shifter 161 in FIG. 3 is in the closed position, and the pulse transformer 26 generates a pulse signal the phase of which is controlled depending on the value of the deviation $e$. Therefore, a firing signal is applied from the phase shifter 161 to the thyristors in the thyristor circuit 10 in FIG. 1, and the regenerative braking torque produced in the low-speed induction motor 2 is regulated so as to reduce the speed of the moving elevator car according to the speed pattern. The kinetic energy of the elevator is regeneratively returned to the ac power source. The other phase shifter 162 is not in operation at this time since the break contact 34b of the relay 34, instead of the make contact 34a, is inserted between the input terminal 18 and the transistor 20 in FIG. 3. Thus, the controlled rectifier circuit 13 is not in operation.

In this state of the control system, a shift occurs from the torque curve $T_{HM}$ of the high-speed induction motor 1 to the torque curve $T_{LM2}$ of the low-speed induction motor 2 in FIG. 6 showing the slip-torque characteristic of the induction motors. For example, a shift from a point $a$ on the torque curve $T_{HM}$ to the torque curve $T_{LM2}$ occurs when the elevator car loaded with the rated load is moving upward. The point $a$ represents the cross point of the torque curve $T_{HM}$ with the line $T_{L2}$ representing the load torque at the motor shaft. It is apparent that, in the case in which the elevator car is moving upward with a heavy load, the elevator car can be stopped more easily than when it is loaded with a light load. In such a case, the deviation $e(= e_p - e_s)$ is relatively small and the thyristor firing angle $\theta$ shown in FIG. 4 is controlled to be relatively small. Therefore, the regenerative braking torque imparted to the low-speed induction motor 2 is relatively small as shown by the curve $T_{LM2}$ in FIG. 6. Of course, the value of the regenerative braking torque is continuously regulated to follow the incessant variation of the deviation $e$. However, for simplicity of explanation, it is supposed that the speed of the elevator car is reduced along the torque curve $T_{LM2}$ to a value at which the slip is given by $S_o$ in FIG. 6.

The switching point detector 17 in the present embodiment is adapted to detect the speed at which the slip is $S_o$ so that the phase shifter 162 can be energized while deenergizing the phase shifter 161 when such speed is detected. Referring to FIG. 5, the bias voltage $E_b$ applied to the base of the transistor 29 is selected to satisfy the relation $E_b = e_{so} + V_{be}$ where $e_{so}$ is the voltage corresponding to the slip $S_o$ and $V_{be}$ is the base-emitter voltage of the transistor 29. Thus, when the output voltage $e_p$ of the tachometer generator 3 is reduced to a level lower than the voltage $e_{so}$ corresponding to the slip $S_o$ with the reduction of the moving speed of the elevator car, the transistor 29 conducts to deenergize the relay 34. As a result, the make contact 34a is restored to the position shown in FIG. 3 to deenergize the phase shifter 161, while the break contact 34b (not shown) is urged to the closed position to energize the phase shifter 162. Therefore, the thyristor circuit 10 controlling the regenerative braking torque imparted to the low-speed induction motor 2 in FIG. 1 is rendered non-operative, while the controlled rectifier circuit 13, which acts to produce the dc braking torque in the high-speed induction motor 1 and controls the value of such torque, is now placed in operation. The manner of controlling the dc braking torque in this case is similar to that for the regenerative braking torque. That is, this dc braking torque is controlled until the elevator car is completely stopped while carrying out the feedback control depending on the deviation $e$ so as to attain the equality between the tachometer generator output $e_p$ representative of the actual speed and the speed pattern signal generator output $e_s$ representative of the speed pattern. Thus, in the speed range lower than the speed at which the slip is $S_o$, the dc braking torque represented by the broken curve $T_{DB}$ is relied on in lieu of the regenerative braking torque represented by the solid curve $T_{LM}$ as seen in FIG. 6 for reducing the speed of the elevator car until the elevator car is completely stopped.

A shock may be imparted to the passengers in the elevator car unless the regenerative braking condition is smoothly switched over to the dc braking condition. In the present embodiment, the desired smooth switchover from the regenerative braking condition to the dc braking condition can be attained by the unique operating characteristic of the phase shifter structure shown in FIG. 3. Referring to FIG. 3 again, the capacitor 19 is provided to prevent an abrupt drop of the base voltage of the transistor 20 due to breaking of the make contact 34a. The capacitor 19 charged by the voltage $e = (e_p - e_s)$ applied before breaking of the make contact 34a discharges gradually to decrease the firing angle $\theta$ gradually so that the regenerative braking torque $T_{LM}$ is gradually reduced along a curve $b - S_N$ as shown in FIG. 7. When the curve representing the speed pattern output of the speed pattern signal generator 14 is such as to provide a constant deceleration, the corresponding braking torque for reducing the speed of the elevator car is substantially constant, and in this case, the actual torque curve may be as shown in FIG. 7. It is to be noted that the braking torque curves in FIG. 6 are illustrated merely for convenience of explanation and differ from actual ones.

In the phase shifter 162, the break contact 34b is turned on or urged to make position to place the phase shifter 162 in operation. In this case too, the capacitor 19 is not rapidly charged up to the voltage level of the input voltage $e$, but it is gradually charged to increase the firing angle $\theta$ gradually. Therefore, the dc braking torque $T_{DB}$ is also gradually increased along a curve $S_o - c$ as shown in FIG. 7. The sum of these torques acts to brake the elevator car so that a smooth shift between these torques can be carried out in the range $b = c$.

It will thus be understood that, in the ac elevator control system of the present invention, the regenerative braking torque is utilized for braking when the elevtor car is moving at a relatively high speed and the dc braking torque is utilized for braking when the speed of the elevator car is reduced to a relatively low speed. The present invention can thus provide the following advantages:

1. The kinetic energy of the elevator system operating in a high speed range can be regeneratively returned to the ac power source for saving the electric power.

2. Although the regenerative braking torque disappears in a low speed range, a dc braking torque appears in this range to compensate for the disappearance of the regenerative braking torque as seen in FIG. 6. Thus, the braking torque can be effectively applied to the elevator system throughout the entire speed range.

Figure 8:
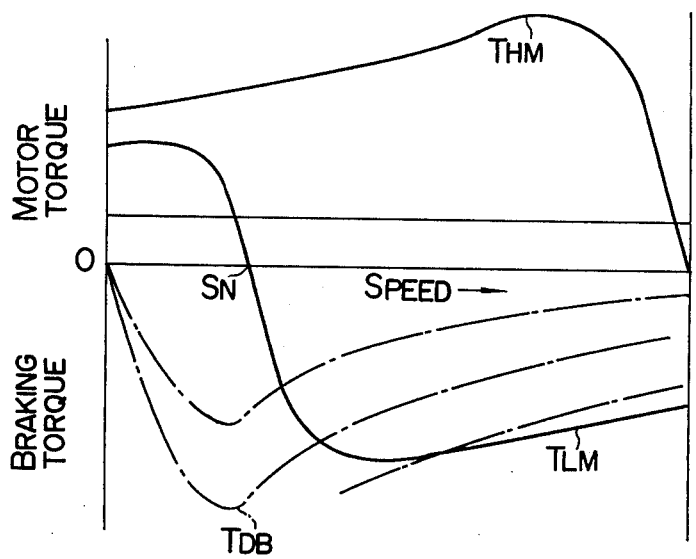

3. Generally, the regenerative braking torque is large in a high speed range and the dc braking torque is large in a relatively low speed range as shown in FIG. 8. These tendencies are uniquely utilized so as to obtain an effectively large braking torque throughout the entire speed range.

Figure 9:
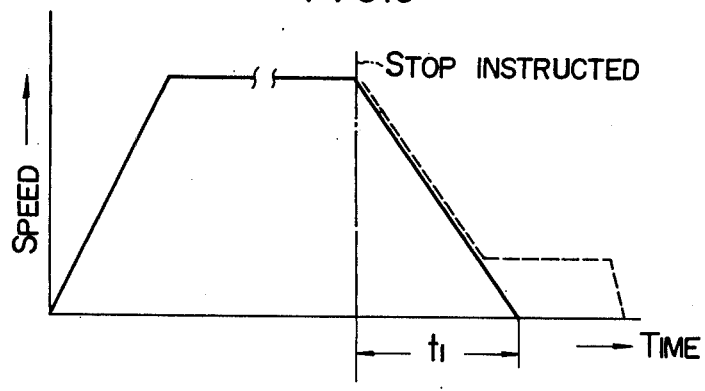
FIG. 9 is a graph showing the relation between time and the running speed of the elevator car controlled by the system according to the present invention.

4. The feedback control can be applied throughout the entire speed range. Thus, the speed of the elevator car can be rectilinearly reduced as shown by the solid line in FIG. 9, whereas prior art systems of this kind can only reduce the speed in a manner as shown by the broken line in FIG. 9. Therefore, the period of time $t_1$ required to stop the elevator car is considerably shorter than hitherto and the transporting efficiency of the elevator car can be improved correspondingly.

5. By virtue of the above advantage, the speed of the elevator car can be reduced continuously without any terrace in the speed curve, and the passengers in the elevator car can enjoy a more comfortable ride.

6. The regenerative braking torque and dc braking torque can be generally decreased and increased respectively as seen in FIG. 7. Thus, the regenerative braking condition can be smoothly shifted to the dc braking condition without imparting a shock to the passengers in the elevator car.

Figure 10:
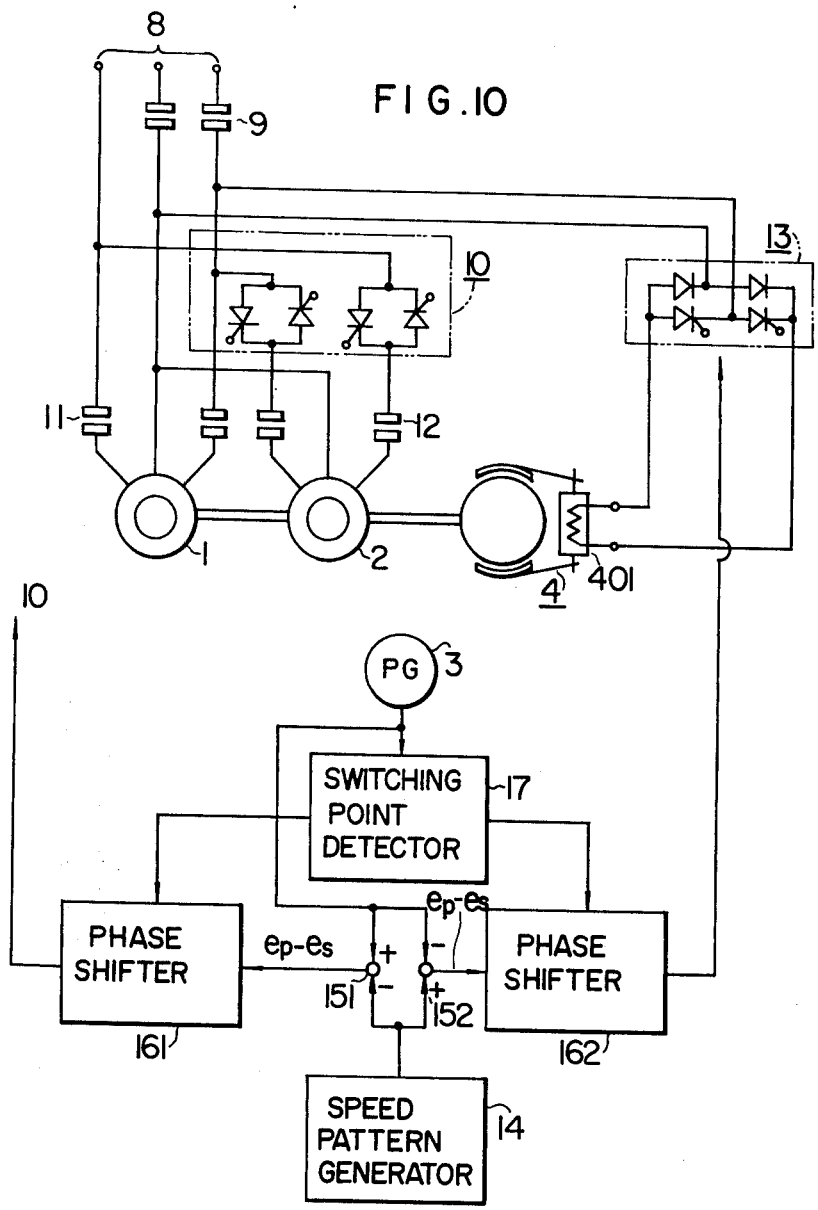
FIGS. 10 to 12 are block diagrams of other embodiments of the present invention.

FIG. 10 shows another embodiment of the present invention. This embodiment is actually a modification of the system shown in FIG. 1 and differs from the latter in that an electromagnetic brake 4 of the type capable of applying a variable braking force is employed in lieu of the dc braking means. This electromagnetic brake 4 is similar to that commonly employed in elevator systems and comprises brake springs, a brake coil 401 and brake arms. The braking torque is produced by the brake springs, and the magnetic force of attraction produced by the current flowing through the brake coil 401 is utilized to release the brake arms. This braking torque decreases in inverse proportion to the current value flowing through the brake coil 401. The manner of control is such that, when the tachometer generator output $e_p$ is higher than the speed pattern signal generator output $e_s$, the brake current value decreases to increase the braking force, while when the tachometer generator output $e_p$ is lower than the speed pattern signal generator output $e_s$, the brake current value increases to decrease the braking force. To this end, it is necessary to derive the value of $(e_s - e_p)$ in addition to the value of $(e_p - e_s)$, and a pair of comparators 151 and 152 are provided in lieu of the single comparator 15 shown in FIG. 1.

Figure 11:
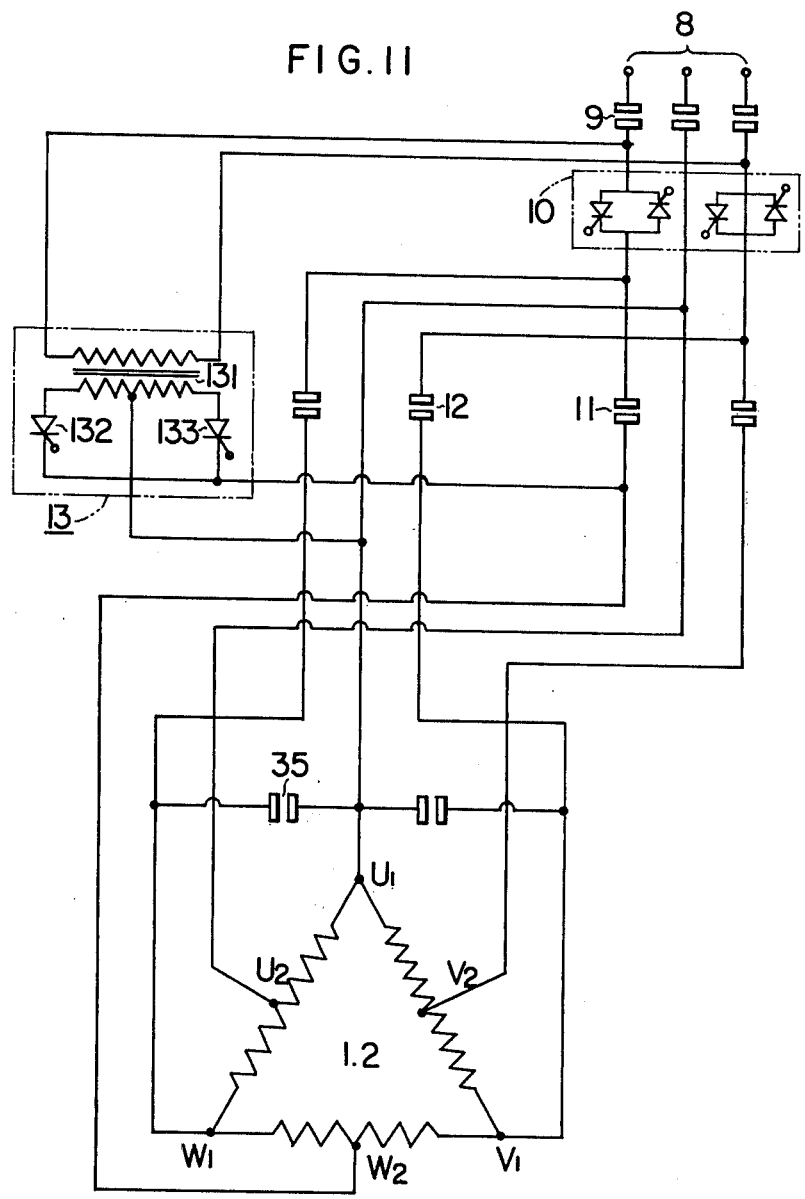

FIG. 11 shows still another embodiment of the present invention. The system shown in FIG. 11 comprises a single induction motor of the one-winding two-speed type. In the starting and accelerating stage for an elevator car, main contactors 9, high-speed side contactors 11 and shorting contactors 35 are turned on to apply a three-phase ac voltage across the terminals $U_2$, $V_2$ and $W_2$ of the winding from a three-phase ac power source 8. In this case, the motor operates as, for example, a four-pole induction motor of double star (2Y) connection. In the decelerating stage for the elevator car, both the high-speed side contactors 11 and the storting contactors 35 are turned off and low-speed side contactors 12 are turned on to apply the three-phase ac voltage across the terminals $U_1$, $V_1$ and $W_1$ of the winding of the motor. In this latter case, the motor operates as, for example, an eight-pole induction motor of delta ($\Delta$) connection. A regenerative braking torque can be applied in this latter case since the synchronous speed of the induction motor of the delta connection is the half of the synchronous speed of the induction motor of the double star connection.

The firing angle of thyristors in a thyristor circuit 10 is controlled as required as described with reference to FIG. 1 so as to control the regenerative braking torque. As soon as the switching point is detected with the reduction of the speed of the elevator car, the firing angle of the thyristors in the thyristor circuit 10 is decreased or the contactors 12 are turned off, and at the same time, a controlled rectifier circuit 13 including a transformer 131 and a pair of thyristors 132 and 133 is placed in operation. The dc output voltage of the circuit 13 is applied across the terminals $U_1$ and $W_2$ so that a strong dc braking torque can be obtained. In this case too, the firing angle of the thyristors 132 and 133 is controlled as required to control the braking torque.

Figure 12:
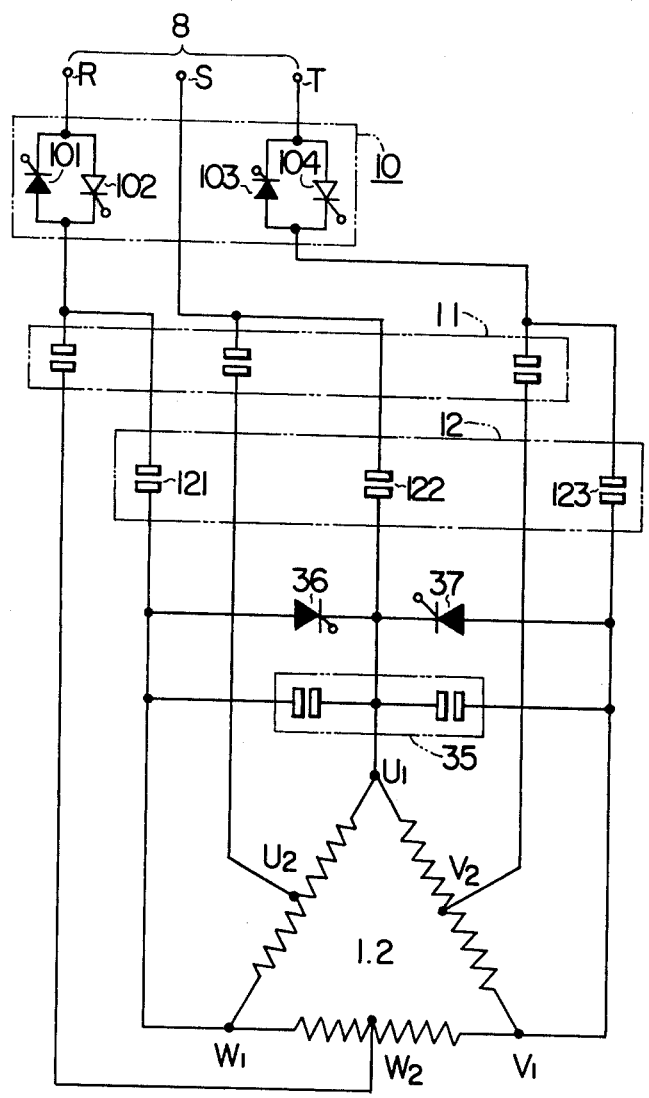

FIG. 12 shows yet another embodiment of the present invention. The embodiment shown in FIG. 12 is actually a modification of the system shown in FIG. 11, and an improvement is made in the dc braking circuit of the system shown in FIG. 11. Referring to FIG. 12, the thyristors 101 and 103 in the thyristor circuit 10 are solely turned on to impart a dc braking torque to the motor by supplying direct current by two routes, one of which is traced from the power supply terminal S — contactor 122 — winding terminal $U_1$ — winding terminal $U_2$ — winding terminal $W_1$ — contactor 121 — thyristor 101 to the power supply terminal R, and the other of which is traced from the power supply terminal S — contactor 122 — winding terminal $U_1$ — winding terminal $V_2$ — winding terminal $V_1$ — contactor 123 — thyristor 103 to the power supply terminal T.

The direct current supplied to the motor is in a half-wave rectified form, and it is undesirable to supply the direct current in that form since the current pulsates considerably, the braking torque produced thereby is not so large and noises tend to occur. To prevent the above disadvantages, free-wheel thyristors 36 and 37 are connected across the terminals $W_1$ and $U_1$ and across the terminals $V_1$ and $U_1$ respectively. Thus, the thyristors 101, 103, 36 and 37 colored in black are used in the condition in which the dc braking torque is imparted. Further, the phase of the gate signal applied to these thyristors, especially the thyristors 101 and 103, may be suitably controlled so as to control the braking torque. Therefore, the regenerative braking torque can be controlled by controlling the thyristors in the thyristor circuit 10, and with the reduction in the speed of the elevator car, the firing angle of the thyristors 102 and 104 may be gradually decreased to increase the weight of the thyristors 101 and 103 so as to ensure an automatic and smooth shift from the regenerative braking condition to the dc braking condition. Further, when the speed of the elevator car is reduced excessively in the above manner of control, the firing angle of the thyristors 102 and 104 may be suitably increased again so as to place the motor in the motoring state. Other controls are similar to those described with reference to FIG. 11.

In the embodiments shown in FIGS. 11 and 12, a single induction motor of the one-winding two-speed type is provided in lieu of separately providing a high-speed induction motor and a low-speed induction motor as shown in FIG. 1 or 10. However, the arrangement may be similar to that of FIG. 1 or 10 and a one-winding two-speed motor may be employed as the low-speed induction motor while leaving the high-speed induction motor in the form shown in FIG. 1 or 10. In such a case, the connection providing the greater number of poles in the low-speed induction motor is utilized to impart the regenerative braking torque, and the synchromous speed of the low-speed induction motor in this state of connection is very low. Thus, the regenerative braking condition can be extended to a considerably low speed range of the elevator car and a greater effect of electric power saving can be exhibited.

Figure 13:
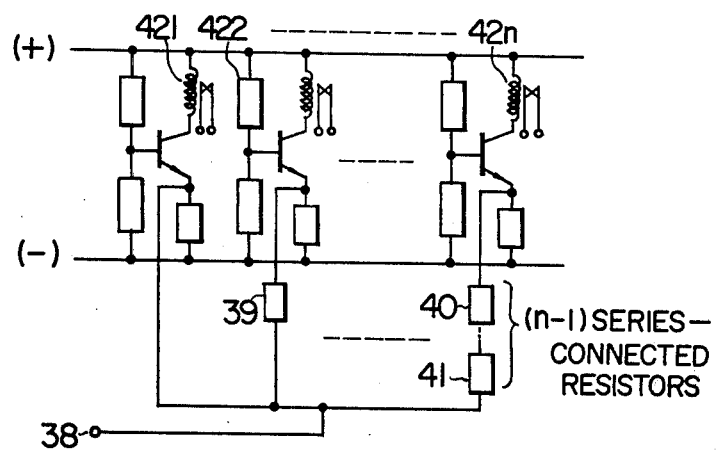
FIGS. 13 and 14 are circuit diagrams of means for generating a braking torque instruction signal responsive to a load.
Figure 14:
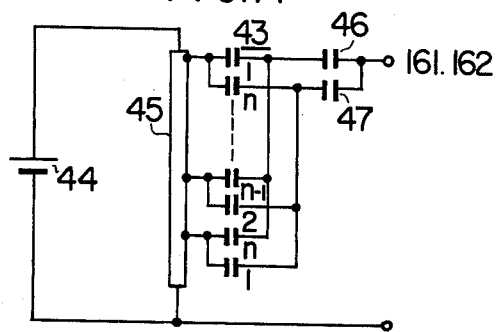
Figure 15:
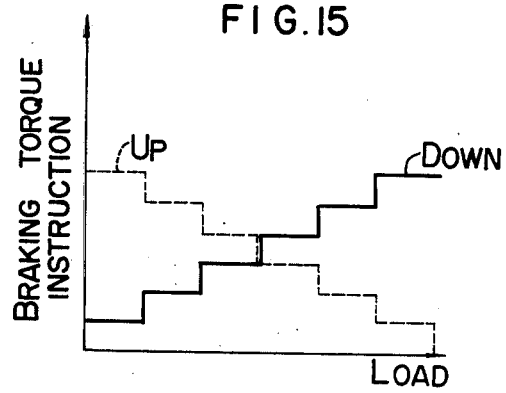
FIG. 15 is a graph showing the relation between the load and the output of the braking torque instruction signal generator shown in FIGS. 13 and 14.

The embodiments described hereinbefore have referred to the manner of control based on the speed feedback. However, in the case of an elevator car whose rated speed is relatively low, the desired practical operating performance can be obtained by merely regulating the braking torque by means of a commonly conventionally employed load detector without relying upon such feedback control. For example, a load detector such as a differential transformer may be employed and the output thereof may be applied to a memory having a structure as shown in FIG. 13 to be stored therein. A braking torque instruction signal generator having a structure as shown in FIG. 14 may be provided to generate an output voltage which is variable stepwise depending on the content of the memory as shown in FIG. 15. This braking torque instruction signal may be applied to the phase shifters 161 and 162 shown in FIG. 1 or 10.

Referring to FIG. 13, the output voltage of the load detector is applied to an input terminal 38 which is connected to the emitter of a first transistor directly, to the emitter of a second transistor through a resistor 39, and to the emitter of an $n$th transistor through $(n-1)$ series-connected resistors 40 and 41 as shown. Relays 421, 422, . . . 42$n$ are connected to the collector of the respective transistors. Therefore, these relays 421, 422, . . . 42$n$ are selectively energized and deenergized depending on the level of the output voltage of the load detector.

Referring to FIG. 14, a resistor 45 having a plurality of taps is connected across a dc power source 44, and contacts 43 of the respective relays 421, 422, . . . 42$n$ are connected to the corresponding taps of the resistor 45. These relay contacts 43 are turned on when the corresponding relays are energized. This relay contact group is connected to a pair of relay contacts 46 and 47 which are turned on when the elevator car moves upward and downward respectively. Thus, the voltage appearing at the output of the circuit shown in FIG. 14 is variable stepwise depending on the detected load as shown in FIG. 15. This output voltage is applied to, for example, the phase shifters 161 and 162 in FIG. 1. The means shown in FIGS. 13 and 14 can replace the tachometer generator 3, speed pattern signal generator 14 and comparator 15, and yet a practically satisfactory floor arrival performance of the elevator car can be obtained.

When the means shown in FIGS. 13 and 14 are employed, the switching point detector 17 must be of another form different from that shown in FIG. 5 due to the fact that the tachometer generator 3 is eliminated. The function required for the switching point detector in the present invention is such that it can detect the point at which the regenerative braking torque becomes ineffective or a suitable point before that point in the course of the reduction of the elevator car speed by the impartation of the regenerative braking torque. Theoretically, therefore, such point may be detected by detecting disappearance or decrease of regenerated current beside detecting the speed of the elevator car. However, this is impractical as a matter of fact.

This switching point detection will be discussed with reference to FIG. 6 again. Suppose that the elevator car is moving upward with the rated load or downward with no load. In this case, the regenerative braking torque becomes ineffective at a point corresponding to a slip $S_1$ at which the torque curve $T_{LM2}$ representing the regenerative braking torque intersects the line $T_{L2}$ representing the load torque of the motor. Suppose then that the elevator car is moving downward with the rated load or upawrd with no load. In this latter case, the regenerative braking torque becomes ineffective at a point corresponding to a slip $S_3$ at which the torque curve $T_{LM1}$ representing the regenerative braking torque intersects the line $T_{L1}$ representing the load torque of the motor. It is therefore possible to detect these points $S_1$ and $S_3$ and a point $S_2$ representing the slip corresponding to the synchronous speed of the low-speed motor as depicted in FIG. 6 by detecting the load and speed of the elevator car. The effect of saving the electric power is greatest when an arrangement is provided which can detect such points for switch-over from the regenerative braking condition to another braking condition.

Figure 16:
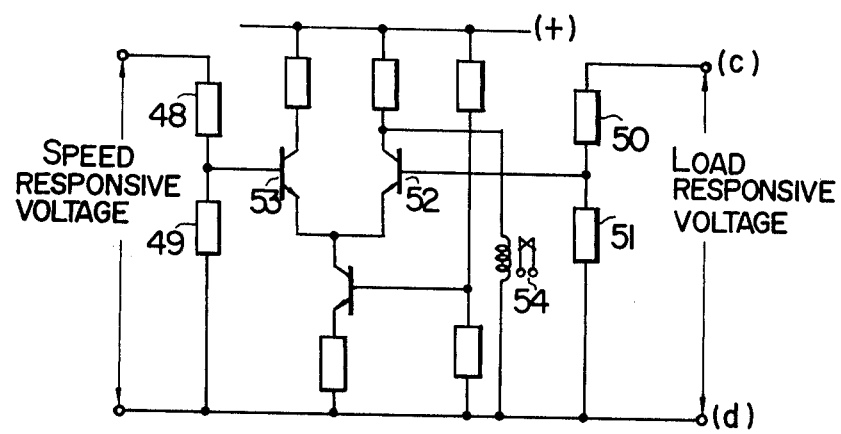
FIGS. 16 and 17 are circuit diagrams of another form of the switching point detector.
Figure 17:
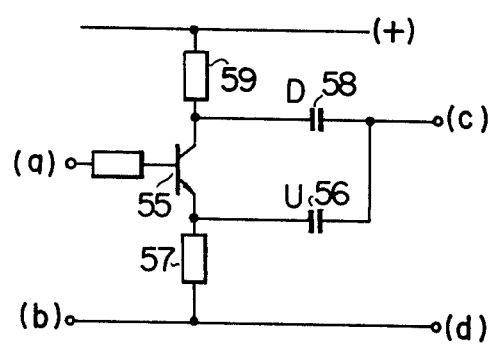

FIGS. 16 and 17 show means adapted for such manner of switching point detection. Referring to FIG. 16, a signal representative of the speed of the elevator car and a signal representative of the load of the elevator car are applied to a differential amplifier consisting of a pair of transistors 52 and 53. In FIG. 16, the speed responsive signal and the load responsive signal are applied to the differential amplifier in a relation as described below. The output voltage of the tachometer generator 3 at the elevator speed corresponding to the slip $S_1$ in FIG. 6 is applied to the circuit of FIG. 16 and is divided by a pair of voltage-dividing resistors 48 and 49 to provide a voltage $e_o$ at the connection point of the resistors 48 and 49. The output voltage of the load detector which may be a weighing means is applied to the circuit and is also divided by a pair of voltage-dividing resistors 50 and 52 to provide a voltage $e_o$ at the connection point of the resistors 50 and 51 when the elevator car is loaded with the rated load. Thus, when the elevator car is moving upward with the rated load, the base voltage of the transistor 52 is $e_o$. When the elevator car loaded with the rated load is moving at a speed which is high enough to provide the regenerative braking effect, the speed responsive voltage is quite high and the base voltage of the transistor 53 is higher than $e_o$. As a result, the transistors 53 and 52 are in the conducting state and non-conducting state respectively, and a relay 54 is in the energized state. Then, when the speed of the elevator car is reduced by the regenerative braking effect to the level corresponding to the slip $S_1$ in FIG. 6, the voltage applied to the base of the transistor 53 is reduced to $e_o$. Therefore, the transistors 53 and 52 are turned off and on respectively and the relay 54 is deenergized when the speed of the elevator car is reduced to a level below the level specified above. The switching point can thus be detected by the deenergization of the relay 54.

In the case in which the elevator car is moving upward with no load or downward with the rated load, the load responsive voltage applied to the base of the transistor 52 is selected to be equal to the speed responsive voltage applied to the base of the transistor 53 when the speed of the elevator car corresponds to the slip $S_3$ in FIG. 6. It will thus be understood that the range of $S_1 \rightarrow S_2 \rightarrow S_3$ in FIG. 6 can be detected under all the operating conditions.

FIG. 17 shows one form of means for applying the load responsive voltage to the circuit shown in FIG. 16 depending on the moving direction of the elevator car. The circuit shown in FIG. 17 utilizes the fact that the load torque imparted to the motor shaft is reversed in direction when the moving direction of the elevator car is reversed although the load of the elevator cage detected by the load detector such as the weighing means remains the same irrespective of the moving direction. Referring to FIG. 17, the output of the load detector such as the weighing means is applied across the input terminals $a$ and $b$. This input is amplified by a transistor 55. The output of the transistor 55 appears across the output terminals $c$ and $d$ through an emitter resistor 57 and a relay contact 56 when the elevator car is moving upward. On the other hand, such output appears across the output terminals $c$ and $d$ through a collector resistor 59 and another relay contact 58 when the elevator car is moving downward. These output terminals $c$ and $d$ are connected to the load responsive voltage input terminals in FIG. 16.

What we claim is:

1. In an ac elevator which is provided with a multi-speed induction motor until connected to a three-phase ac power source and including a high-speed induction motor having a relatively high synchronous speed and a low-speed induction motor having a relatively low synchronous speed, and means for starting and accelerating said elevator car by means of a high-speed induction motor, a control system comprising regeneration braking means for imparting a regenerative braking torque to said low-speed induction motor by application of ac voltage thereto from said ac power source so as to reduce the moving speed of the elevator car, additional braking means for imparting another type of braking torque to the elevator car driving system, means for detecting a predetermined switching point between impartation of said regenerative braking torque and impartation of said other braking torque occurring before said regenerative braking torque becomes ineffective, and switching means responsive to the output of said switching point detecting means for deenergizing said regenerative braking means and energizing said additional braking means.

2. An ac elevator control system as claimed in claim 1, wherein said swtiching point detecting means comprises means for setting a predetermined speed level corresponding to the switching point, means for detecting the moving speed of the elevator car, and means for detecting the reduction of the detected speed to a level lower than said speed setting.

3. An ac elevator control system as claimed in claim 1, wherein said switching means comprises means for gradually reducing the ac voltage supplied from said ac power source to said low-speed induction motor, and means for gradually increasing said other braking torque.

4. An ac elevator control system as claimed in claim 1, wherein said regenerative braking means comprises at least one set of thyristors connected in parallel in opposite polarity between said low-speed induction motor and said ac power source, and means for controlling the firing angle of said thyristors.

5. An ac elevator control system as claimed in claim 4, wherein the said means for controlling the firing angle of said thyristors comprises speed pattern signal generating means, means for detecting the moving speed of the elevator car, and means for generating an output whose phase is controlled depending on the deviation of the detected speed from said speed pattern.

6. An ac elevator control system as claimed in claim 1, wherein said additional braking means is a dc braking means which supplies direct current to one of said induction motors in said induction motor unit.

7. An ac elevator control system as claimed in claim 6, wherein said direct current is supplied to said high-speed induction motor.

8. An ac elevator control system as claimed in claim 6, wherein said direct current is supplied to said low-speed induction motor.

9. An ac elevator control system as claimed in claim 6, wherein said dc braking means comprises a rectifier circuit including thyristors connected between said ac power source and one of said induction motors, and means for controlling the firing angle of said thyristors.

10. An ac elevator control system as claimed in claim 9, wherein said means for controlling the firing angle of said thyristors comprises speed pattern signal generating means, means for detecting the moving speed of the elevator car, and means for generating an output whose phase is controlled depending on the deviation of the detected speed from said speed pattern.

11. An ac elevator control system as claimed in claim 1, wherein said multi-speed induction motor unit comprises a single three-phase induction motor having an armature winding that can be changed over between a double star connection and a delta connection, and means are provided for supplying the electric power from said ac power source to the armature winding changed over to said double star connecion thereby accelerating the elevator car, said regenerative braking means including means for connecting said ac power source to the armature winding changed over to said delta connection, and said additional braking means including means for supplying direct current to the armature winding changed over to said delta connection.

12. An ac elevator control system as claimed in claim 1, wherein said multi-speed induction motor unit comprises a single three-phase induction motor having an armature winding that can be changed over between a double star connection and a delta connection, and means are provided for supplying the electric power from said ac power source to the armature winding changed over to said double star connection through at least one set of thyristors connected in parallel in opposite polarity thereby accelerating the elevator car, said regenerative braking means including means for supplying the electric power from said ac power source through said thyristor set to the armature winding changed over to said delta connection, and said additional braking means including means for supplying direct current to the armature winding changed over to said delta connection.

13. An ac elevator control system as claimed in claim 12, wherein said direct current supplying means includes means for firing at least one of the thyristors in said thyristor set.

14. An ac elevator control system as claimed in claim 13, further comprising a pair of additional thyristors connected in parallel with the respective portions of said delta-connected armature winding through which said direct current flows, and means for firing said additional thyristors in the dc braking condition.

15. An ac elevator control system as claimed in claim 1, wherein said additional braking means comprises an electromagnetic brake and means for controlling the energization of said electromagnetic brake.

16. An ac elevator control system as claimed in claim 1, further comprising means for detecting the load of the elevator car, means for generating a braking torque instruction signal depending on the load detected by said detecting means, and means for applying said braking torque instruction signal to said regenerative braking means and said additional braking means.

17. An ac elevator control system as claimed in claim 1, wherein said high-speed induction motor and said low-speed induction motor are separately provided and coupled directly to each other, said low-speed induction motor including a very-low-speed armature winding in addition to the low-speed armature winding so as to provide a synchronous speed lower than said relatively low synchronous speed, and said regenerative braking means includes mean for connecting said very-low-speed armature winding to said ac power source.

* * * * *